(12) United States Patent
Kaing et al.

(10) Patent No.: US 10,538,866 B2
(45) Date of Patent: Jan. 21, 2020

(54) WOVEN SLEEVE WITH INTEGRAL ATTACHMENT LOOPS AND METHOD OF CONSTRUCTION THEREOF

(71) Applicant: Federal-Mogul Powertrain, LLC, Southfield, MI (US)

(72) Inventors: Alice Kaing, Margny les Compiegnes (FR); Patrick Thomas, Crepy-en-Valois (FR)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 15/885,638

(22) Filed: Jan. 31, 2018

(65) Prior Publication Data

US 2018/0223457 A1    Aug. 9, 2018

Related U.S. Application Data

(60) Provisional application No. 62/453,143, filed on Feb. 1, 2017.

(51) Int. Cl.
    *D03D 3/02*     (2006.01)
    *D03D 23/00*    (2006.01)
    *D03D 15/00*    (2006.01)

(52) U.S. Cl.
    CPC .............. *D03D 3/02* (2013.01); *D03D 15/00* (2013.01); *D03D 23/00* (2013.01); *D03D 2700/03* (2013.01); *D10B 2403/0111* (2013.01)

(58) Field of Classification Search
    CPC .... D03D 3/02; D03D 1/0035; D03D 15/0077; D03D 15/00; D03D 23/00; D03D 2700/03; H02G 3/04; D10B 2403/0111
    See application file for complete search history.

(56) References Cited

U.S. PATENT DOCUMENTS

| | | | |
|---|---|---|---|
| 4,207,885 A | 6/1980 | Hampton et al. |
| 4,654,246 A | 3/1987 | Provost et al. |
| 4,714,096 A | 12/1987 | Guay |
| 5,178,923 A | 1/1993 | Andrieu et al. |
| 5,300,337 A | 4/1994 | Andrieu et al. |
| 5,996,189 A | 12/1999 | Wang |
| 6,443,187 B1 | 9/2002 | Wang et al. |

(Continued)

OTHER PUBLICATIONS

Inernational Search Report, dated Mar. 23, 2013 (PCT/US2018/016328).

*Primary Examiner* — Brian Handville
(74) *Attorney, Agent, or Firm* — Robert L. Stearns; Dickinson, Wright, PLLC

(57) ABSTRACT

A wrappable textile sleeve for protecting an elongate member and method of construction thereof is provided. The sleeve includes a plurality of warp filaments and at least one weft filament woven with one another to form a woven wall. The woven wall has opposite sides extending lengthwise between opposite ends. The opposite sides are wrappable about a central longitudinal axis into overlapping relation with one another to bound the elongate member within a cavity of the sleeve. At least one warp and/or weft filament is provided as a bulky, fluffy multifilament, wherein the bulky, fluffy multifilament is woven to form at least one float extending over 2 or more weft and/or warp yarns, wherein the at least one float provides loops sufficient to readily fix themselves to hooks of a standard hook and loop fastener.

38 Claims, 6 Drawing Sheets

(56) References Cited

U.S. PATENT DOCUMENTS

| | | |
|---|---|---|
| 6,546,603 B1 | 4/2003 | Wang et al. |
| 6,728,998 B2 | 5/2004 | Wang et al. |
| 7,426,840 B2 | 9/2008 | Sytz |
| 8,468,853 B2 | 6/2013 | Shepley, Jr. et al. |
| 9,027,367 B2 | 5/2015 | Shepley, Jr. et al. |
| 2002/0185192 A1 | 12/2002 | Wang et al. |
| 2011/0123759 A1 | 5/2011 | Rodrigues et al. |
| 2014/0174585 A1* | 6/2014 | Itoh ............... D03D 1/0041 139/387 R |
| 2014/0262478 A1* | 9/2014 | Harris ............. H05K 9/009 174/393 |
| 2014/0305536 A1* | 10/2014 | Gao ............... H05B 3/03 139/291 C |

\* cited by examiner

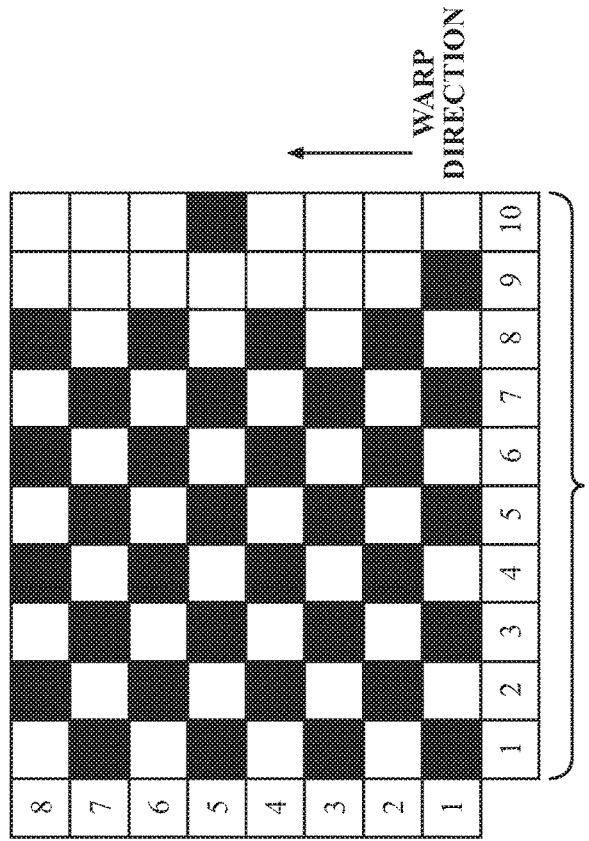

WOVEN SLEEVE WITH INTEGRAL ATTACHMENT LOOPS AND METHOD OF CONSTRUCTION THEREOF

CROSS-REFERENCE TO RELATED APPLICATION

This application claims the benefit of U.S. Provisional Application Ser. No. 62/453,143, filed Feb. 1, 2017, which is incorporated herein by reference in its entirety.

BACKGROUND OF THE INVENTION

1. Technical Field

This invention relates generally to textile sleeves for protecting elongate members, and more particularly to textile sleeves configured for attachment to support member.

2. Related Art

Wires are commonly bundled together and protected by textile sleeves in the form of a wire harness. The wire harness is often fixed to an external support member, such as a vehicle frame member or some other vehicle component to maintain the wire harness in a fixed location. Typically, supplemental members, separate from the wire harness, are used to fix the wire harness in location, such as clips, adhesives, plastic ties, and separately provided hook and loop fasteners, wherein one of the hook or loop portions is fixed via a secondary operation, such as via stitching or adhesive, to an external surface of the sleeve for fixation to the other of the hook or loop that is fixed to the desired support member. Although these mechanisms can prove useful for fixing the wire harness in location, they come at a cost associated with the secondary products and operations.

A sleeve constructed in accordance with the disclosure herein overcomes at least the drawbacks discussed above.

SUMMARY OF THE INVENTION

A wrappable textile sleeve for protecting an elongate member includes a plurality of warp filaments and at least one weft filament woven with one another to form a woven wall. The woven wall has opposite sides extending lengthwise between opposite ends. The opposite sides are wrappable about a central longitudinal axis into overlapping relation with one another to bound the elongate member within a cavity of the sleeve. To allow the woven wall to be readily fixed to a support member, at least one warp and/or weft filament is provided as a bulky, fluffy multifilament, wherein the bulky, fluffy multifilament is woven to form at least one float extending over 2 or more weft and/or warp yarns, wherein the at least one float provides loops sufficient to readily fix themselves to hooks of a standard hook and loop fastener.

In accordance with a further aspect of the invention, a plurality of the warp filaments are provided as a bulky, fluffy multifilaments adjacent one another, with the adjacent bulky, fluffy multifilaments forming floats adjacent one another.

In accordance with a further aspect of the invention, a plurality of the weft filaments are provided as a bulky, fluffy multifilaments adjacent one another, with the adjacent bulky, fluffy multifilaments forming floats adjacent one another.

In accordance with a further aspect of the invention, the floats can be formed having a twill pattern.

In accordance with a further aspect of the invention, the floats can be formed having a satin pattern.

In accordance with a further aspect of the invention, the floats can be formed to extend over only a portion of the length of the wall.

In accordance with a further aspect of the invention, the floats can be formed to extend over only a portion of the circumference of the wall.

In accordance with a further aspect of the invention, the floats can be formed to extend over a full length of the wall.

In accordance with a further aspect of the invention, the floats can be formed to extend over a full circumference of the wall.

In accordance with a further aspect of the invention, at least some of the warp filaments can be provided as monofilaments.

In accordance with a further aspect of the invention, at least some of the weft filaments can be provided as heat-settable monofilaments to be heat-set and bias the opposite sides into overlapping relation with one another to facilitate assembly of the sleeve about the elongate member.

In accordance with a further aspect of the invention, the warp filaments are woven over a plurality of dents, wherein a plurality of the dents each include a plurality of filaments, with at least one of the plurality of filaments including a bulky, fluffy multifilament.

In accordance with a further aspect of the invention, at least one of the plurality of filaments in each of the plurality of dents is a standard multifilament having a denier greater than the denier of the bulky, fluffy multifilament.

In accordance with a further aspect of the invention, the bulky, fluffy multifilament can be woven in a satin weave pattern and the standard multifilament within the same dent as the bulky, fluffy multifilament can be woven in a plain weave pattern.

In accordance with a further aspect of the invention, the denier of the bulky, fluffy multifilament is between about 210-250 tex.

In accordance with a further aspect of the invention, the denier of the standard multifilament is about 1400 Dtex.

In accordance with a further aspect of the invention, a method of constructing a wrappable textile sleeve for protecting an elongate member includes weaving a plurality of warp filaments and at least one weft filament with one another to form a woven wall. The method further includes weaving the wall having opposite sides extending lengthwise between opposite ends, with the opposite sides being wrappable about a central longitudinal axis into overlapping relation with one another to bound the elongate member within a cavity of the sleeve. To allow the woven wall to be readily fixed to a support member, the method further includes weaving at least one warp and/or weft filament as a bulky, fluffy multifilament, and weaving the bulky, fluffy multifilament to form at least one float extending over 2 or more weft and/or warp yarns, with the at least one float providing loops sufficient to readily fix themselves to hooks of a standard hook and loop fastener.

In accordance with a further aspect of the invention, the method can further include weaving a plurality of the warp filaments as bulky, fluffy multifilaments adjacent one another, and weaving the adjacent bulky, fluffy multifilaments having floats adjacent one another to provide an increased surface area of loops configured to interlock with hooks as a hook-and-loop type fastener.

In accordance with a further aspect of the invention, the method can further include weaving a plurality of the weft filaments as bulky, fluffy multifilaments adjacent one another, and weaving the adjacent bulky, fluffy multifilaments forming floats adjacent one another.

In accordance with a further aspect of the invention, the method can further include weaving the floats in a twill pattern.

In accordance with a further aspect of the invention, the method can further include weaving the floats having a satin pattern.

In accordance with a further aspect of the invention, the method can further include weaving the floats to extend over only a portion of the length of the wall.

In accordance with a further aspect of the invention, the method can further include weaving the floats to extend over only a portion of the circumference of the wall.

In accordance with a further aspect of the invention, the method can further include weaving the floats to extend over a full length of the wall.

In accordance with a further aspect of the invention, the method can further include weaving the floats to extend over a full circumference of the wall.

In accordance with a further aspect of the invention, the method can further include weaving at least some of the warp filaments as monofilaments to enhance the abrasion resistance of the sleeve.

In accordance with a further aspect of the invention, the method can further include heat-setting at least some of the weft filaments to bias the opposite sides into overlapping relation with one another.

In accordance with a further aspect of the invention, the method can further include weaving the warp filaments over a plurality of dents and providing a plurality of the dents each including a plurality of filaments, with at least one of the plurality of filaments within at least some of the dents including the bulky, fluffy multifilament.

In accordance with a further aspect of the invention, the method can further include providing at least one of the plurality of filaments within each of the dents as a standard multifilament having a denier greater than the denier of the bulky, fluffy multifilament.

In accordance with a further aspect of the invention, the method can further include weaving the bulky, fluffy multifilament in a satin weave pattern and weaving the standard multifilament in a plain weave pattern within the same dent.

In accordance with a further aspect of the invention, the method can further include providing the denier of the bulky, fluffy multifilament being between about 210-250 tex.

In accordance with a further aspect of the invention, the method can further include providing the denier of the standard multifilament being about 140 tex+/−5%.

BRIEF DESCRIPTION OF THE DRAWINGS

These and other features and advantages will become readily apparent to those skilled in the art in view of the following detailed description of the presently preferred embodiments and best mode, appended claims, and accompanying drawings, in which:

FIG. 12 is a weave diagram used to construct the wrappable protective textile sleeve of FIG. 9;

FIG. 13 is a diagram illustrating the type of warp end filaments used to construct a wrappable protective textile sleeve in accordance with one aspect of the disclosure, such as via the weave diagram of FIG. 12; and FIG. 14 is a view similar to FIG. 13 used to construct a wrappable protective textile sleeve in accordance with another aspect of the disclosure.

DETAILED DESCRIPTION OF PREFERRED EMBODIMENTS

Figure 1:
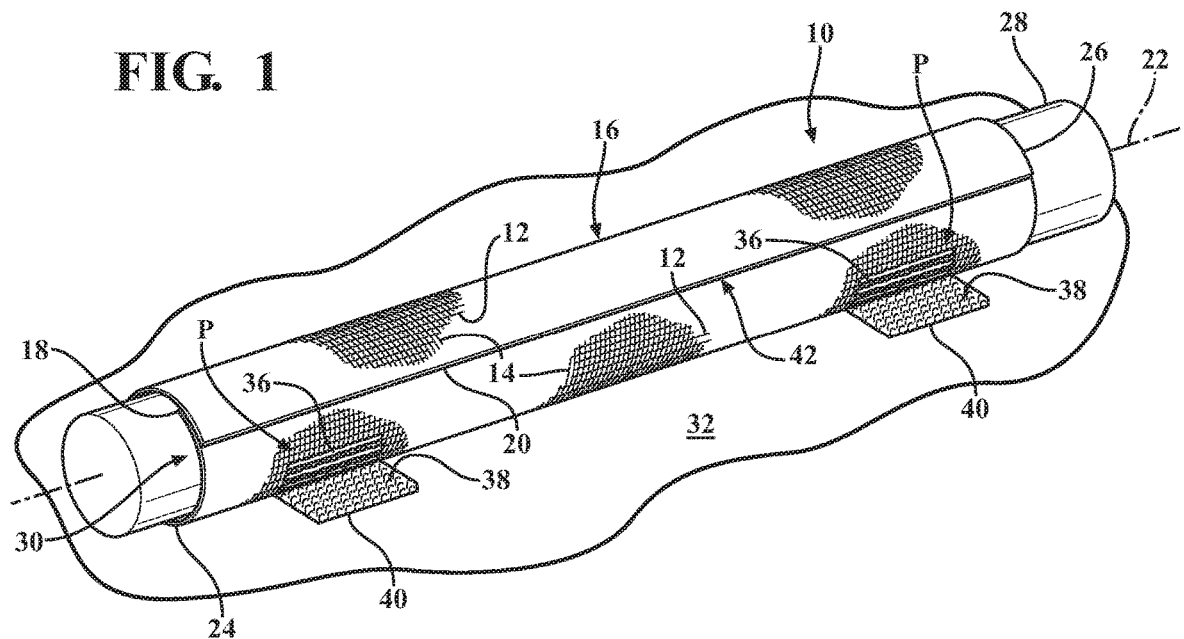
FIG. 1 is a schematic perspective view of a wrappable protective textile sleeve constructed in accordance with one aspect of the disclosure shown wrapped about an elongate member to be protected and attached to a support member.
Figure 1A:
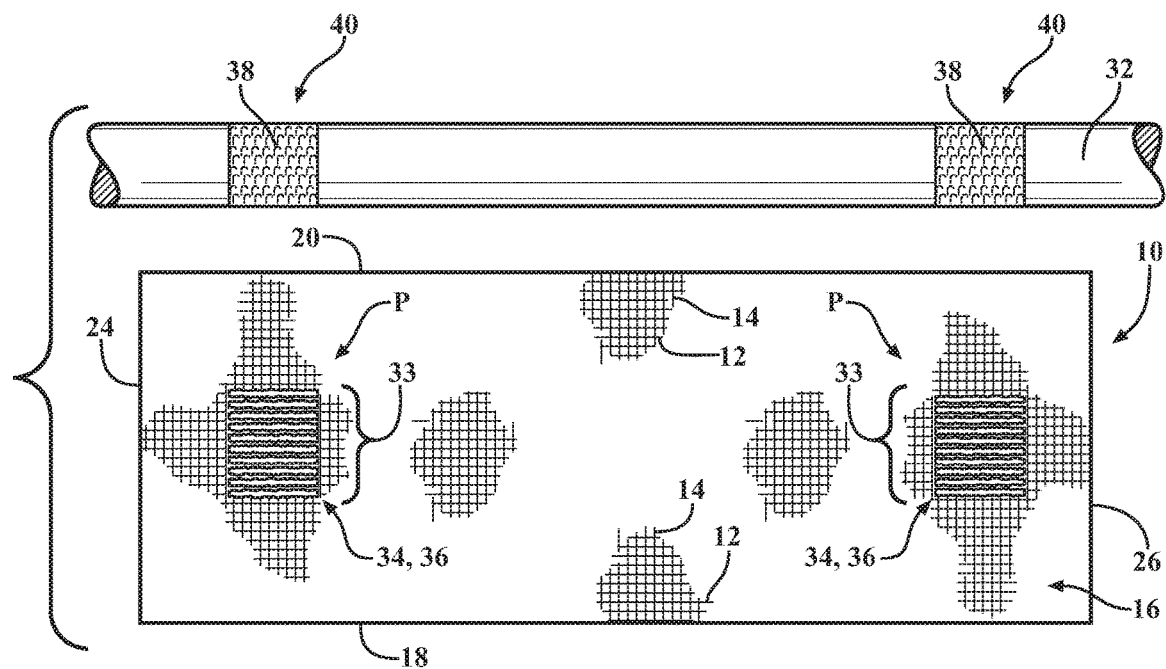
FIG. 1A is a schematic plan view of a wrappable protective textile sleeve constructed in accordance with one aspect of the disclosure for attachment to a support member, with the sleeve shown in an unwrapped state.
Figure 5:
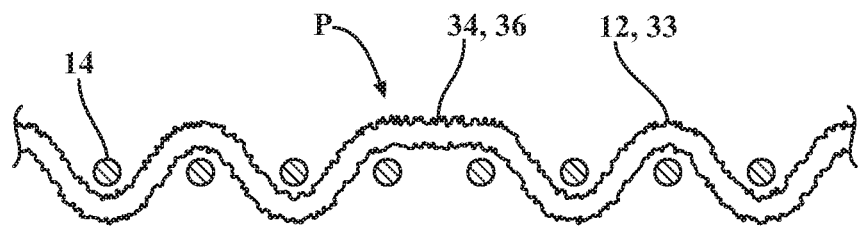
FIG. 5 is a fragmentary schematic end view of a wall of a wrappable protective textile sleeve constructed in accordance with one aspect of the disclosure.
Figure 6:
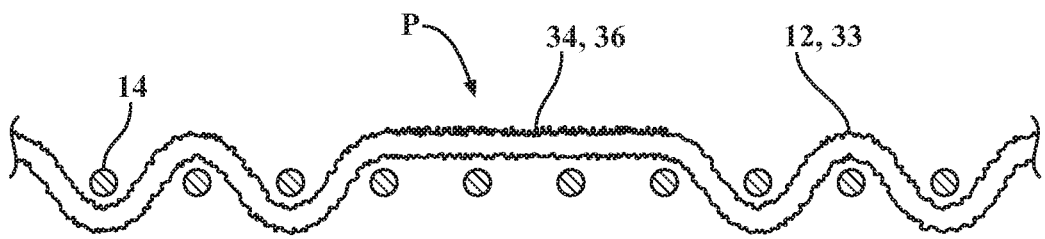
FIG. 6 is a fragmentary schematic end view of a wall of a wrappable protective textile sleeve constructed in accordance with another aspect of the disclosure.

Referring in more detail to the drawings, FIGS. 1 and 1A show schematically a wrappable, protective sleeve, referred to hereafter simply as sleeve 10, constructed in accordance with one presently preferred, non-limiting embodiment of the disclosure, wherein, as shown in FIG. 1, the wall 16 is constructed to be releasably fixed to a support member 32. The sleeve 10 includes a plurality of warp yarns, also referred to as warp filaments 12, and at least one or a plurality of weft yarns, also referred to as weft filaments 14, woven with one another to form a woven substrate, also referred to simply as wall 16. The wall 16 has opposite sides 18, 20 configured to be wrapped about a central longitudinal axis 22 into overlapping relation with one another to bound an elongate member 28 to be protected within a circumferentially enclosed cavity 30 of the sleeve 10, with the opposite sides 18, 20 shown extending lengthwise generally parallel to the central longitudinal axis 22 between opposite open ends 24, 26. To provide an ability for the sleeve 10 to be readily fixed to the support member 32, at least one warp and/or weft filament 12, 14, and shown in the non-limiting embodiment of FIGS. 1 and 1A as being a plurality of warp filaments 12, is provided as a bulky, fluffy multifilament 33, wherein each bulky, fluffy multifilament 33 is woven to form at least one float 34 extending over 2 (FIG. 5) or more (FIG. 6) weft and/or warp yarns 12, 14, wherein the at least one float 34 provides loops 36 sufficient to readily fix themselves to hooks 38 of a hook portion 40 of a standard hook and loop fastener, such as sometimes purchased under the name Velcro®. Accordingly, the sleeve 10 is able to be releasably fixed to the support member 32 without need of having to fix a separate loop fastener portion to the wall 16, as the loops 36 integrally woven into the wall 16 of the sleeve 10 already form a loop fastener portion, also referred to as fastener patch P, integral to the sleeve 10 as woven.

In accordance with a further aspect of the disclosure, the sleeve 10 can be constructed as a self-wrapping sleeve, such that the wall 16 is automatically biased to curl about the central longitudinal axis 22 to bring the opposite sides 18, 20 into their overlapping relation. The self-wrapping bias can be imparted within the wall 16 of the sleeve 10 via heat-setting at least one weft filament 14 or a plurality of weft filaments 14. Accordingly, at least one or a plurality of the weft filaments 14 can be provided as a heat-settable polymeric filament or filaments, wherein the heat-settable weft filament or filaments 14, whether some of all, are preferably monofilaments of a heat-settable thermoplastic, such as, by way of example and without limitation, polyester, thereby allowing the sleeve 10 to be heat-set or otherwise biased into a tubular form.

In accordance with one non-limiting embodiment shown in FIGS. 1 and 1A, a plurality of the warp filaments 12 are provided as bulky, fluffy multifilaments 33. The plurality of warp multifilaments 33 can be woven in immediately adjacent, contiguous relation one another with floats 34 also being formed adjacent and contiguous one another, such that the floats 34 are aligned with one another along a circumferential direction. As such, an increased size fastener patch P of the loops 36, in comparison to that as would be formed by s single bulky, fluffy multifilament 33, is formed for attachment to the hook portion 40. As noted, the warp floats 34 extend over a plurality of adjacent weft filaments, and in accordance one aspect of the invention, the floats 34 can be formed having a twill pattern (FIG. 5) or satin pattern (FIG. 6), wherein, as will be understood by a skilled artisan of the textile arts, the satin pattern would form a longer lengthwise extending fastener patch P of loops 36 than a twill pattern. Of course, it is to be recognized that the respective patches P can be formed in immediate succession with one another to form increased size patches P. The warp floats 34 and fastener patch(es) P formed thereby can be formed to extend over only a portion of the length of the wall 16, in the select, desired location of the wall 16 to be attached to the support member 32, or as shown and discussed hereafter, the patch P can be formed in immediately adjacent relation with one another to extend over a full length of the wall 14, depending on the application and the size and location of the hook portion 40 to which the loops 36 will be attached.

In the embodiment of FIGS. 1 and 1A, a pair of fastener patches P is formed in over select regions of the wall 16 in predetermined axially spaced relation from one another, and in axial, lengthwise alignment with one another, such that the fastener patches P are automatically located for alignment with and releasable fixation to a pair or more of similarly spaced, corresponding hook portions 40. It is to be recognized that although a pair of the fastener patches P are shown, any desired number of fastener patches P could be formed along the length of the sleeve 10. The fastener patches P are shown as being formed as discrete islands spaced from one another in lengthwise alignment with one another and spaced from the opposite sides 18, 20 and from the opposite ends 24, 26. The size and location of each fastener patch P can be precisely controlled in manufacture to ensure the fastener patches P are sized and located for subsequent releasable fixation to the hook portion(s) 40. Although the fastener patches P are formed with warp floats 34, the remaining portion of the wall 16 can be woven via any desired weave pattern, such as a plain weave pattern or otherwise, as desired. Further, it is to be recognized that any type of non-fluffy warp yarn, including monofilament and/or multifilament, can be used in the regions not including the fastener patches P, and thus, the physical properties of the wall 16 on opposite sides of the fastener patches P can be provided as desired, depending on the type of warp 12 and weft yarns 14 used.

Figure 2:
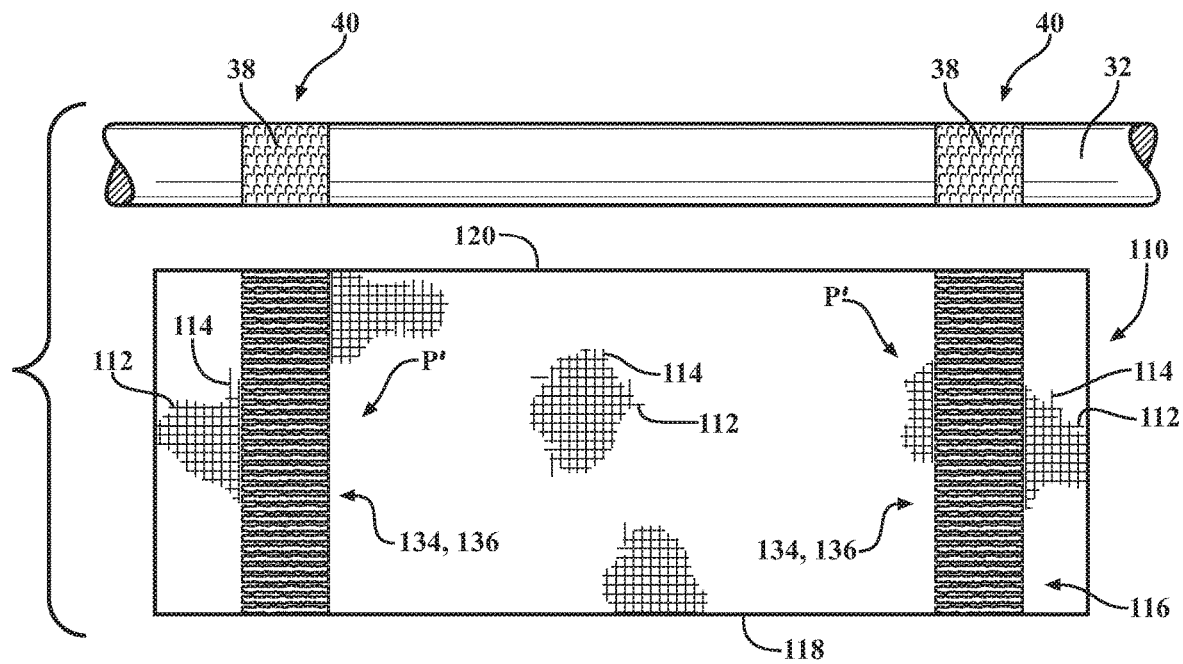
FIG. 2 is a schematic plan view of a wrappable protective textile sleeve constructed in accordance with another aspect of the disclosure for attachment to a support member, with the sleeve shown in an unwrapped state.

In FIG. 2, a sleeve 110 is shown in accordance with another non-limiting embodiment of the disclosure, wherein the same reference numerals as used above, offset by a factor of 100, are used to identify like features. Unlike the sleeve 10 of FIGS. 1 and 1A, the floats 134, loops 136 and respective fastener patches P' formed thereby are formed to extend from one side 118 to an opposite side 120, such that upon wrapping the sides 118, 120 into overlapped relation with one another, the separate fastener patches P' extend about the entirety of the circumference of a wall 116 of the sleeve 110. As such, the user can fix the sleeve 110 to the support member 32 without concern of circumferential orientation of the sleeve 110 to the support member 32, thereby simplifying attachment of the sleeve 110 to the support member 32. Further, this also allows the user to orient a seam 42 (shown in FIG. 1 for convenience) extending between the overlapped sides 118, 120 toward the support member 32, if desired, thereby acting to shield the seam 42 against being inadvertently opened from the ingress of contamination therethrough. It is to be recognized that although a pair of the fastener patches P are shown in axially spaced relation from one another, any desired number of fastener patches P could be formed along the length of the sleeve 110. It is further to be recognized that in the region(s) of the wall 116 not including the fastener patches P, any desired weave pattern can be used to interlace the warp and weft filaments 112, 114 with one another, such as plain weave or otherwise.

Figure 3:
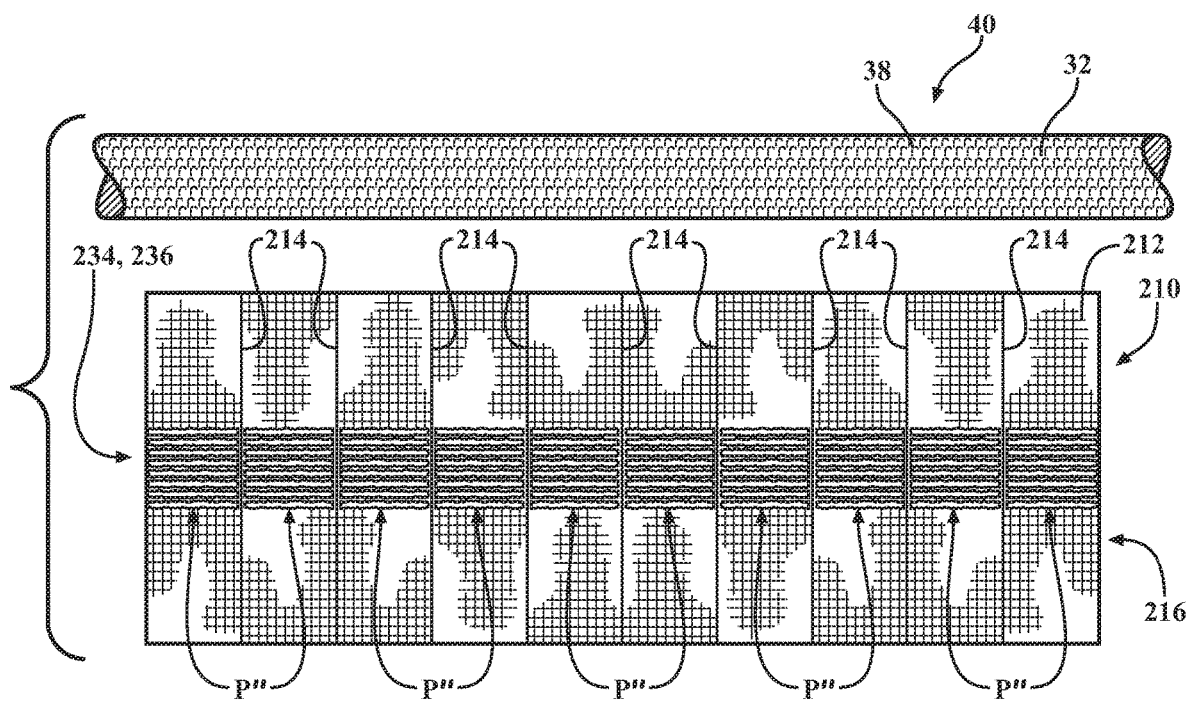
FIG. 3 is a schematic plan view of a wrappable protective textile sleeve constructed in accordance with yet another aspect of the disclosure for attachment to a support member, with the sleeve shown in an unwrapped state.
Figure 3A:
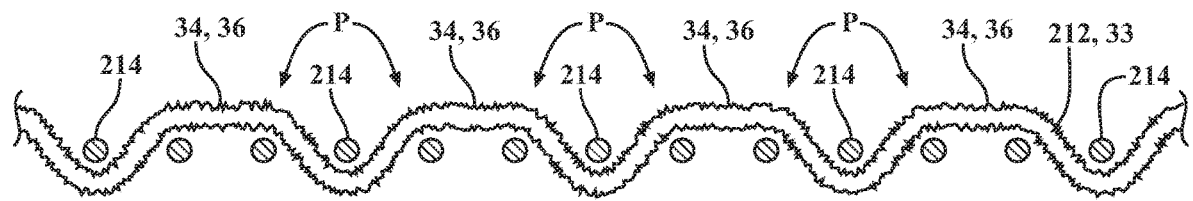
FIG. 3A is a fragmentary schematic end view of a wall of a wrappable protective textile sleeve of FIG. 3.
Figure 4:
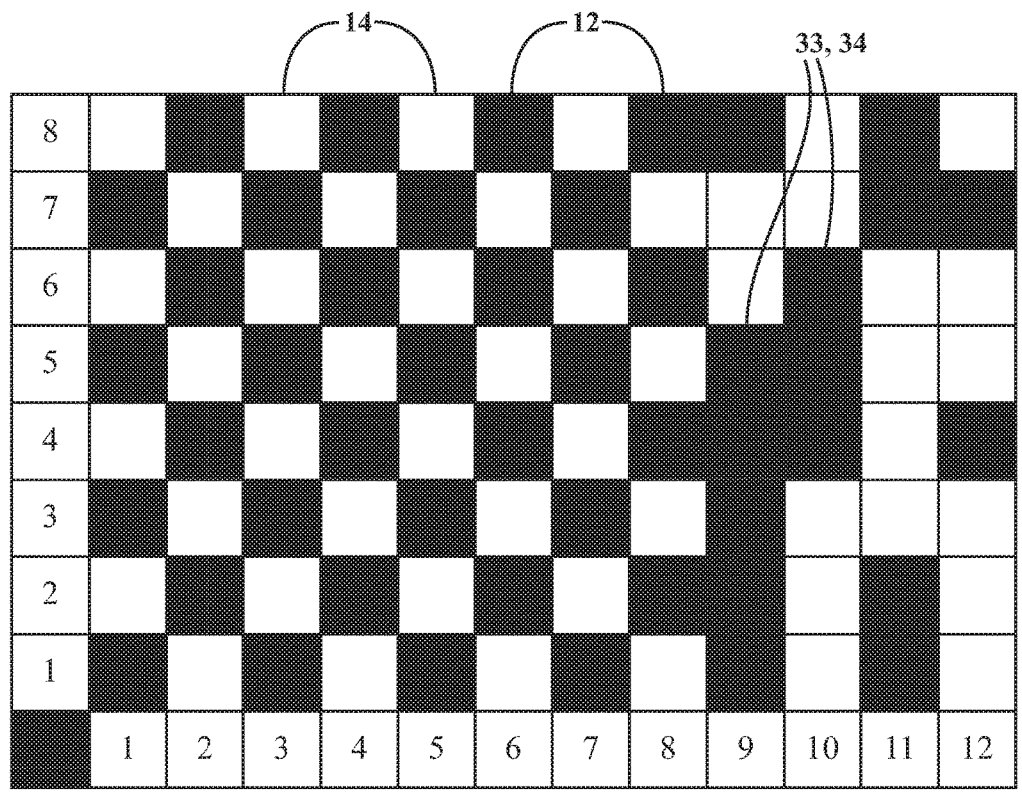
FIG. 4 is a weave diagram used to construct a sleeve in accordance with one aspect of the disclosure.

In FIG. 3, a sleeve 210 is shown in accordance with another non-limiting embodiment of the disclosure, wherein the same reference numerals as used above, offset by a factor of 200, are used to identify like features. Unlike the sleeve 10 of FIGS. 1 and 1A, the floats 234, loops 236 and respective fastener patches P''' formed thereby are formed to extend immediately adjacent one another in succession along a full length of the wall 216, with the immediately adjacent patches P''' being divided from one another by a weft filament 214 (FIG. 3A). As such, the user can fix the entirety of the length of the sleeve 210 to the support member 32 without concern of axially aligning patches P''' of the sleeve 110 with the support member 32, thereby simplifying attachment of the sleeve 210 to the support member 32.

Figure 7:
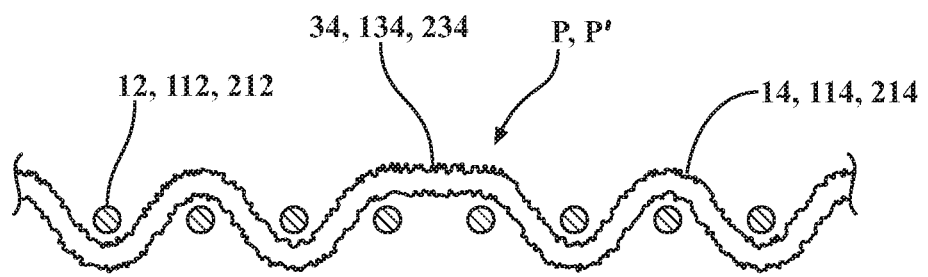
FIG. 7 is a fragmentary schematic end view of a wall of a wrappable protective textile sleeve constructed in accordance with yet another aspect of the disclosure.
Figure 8:
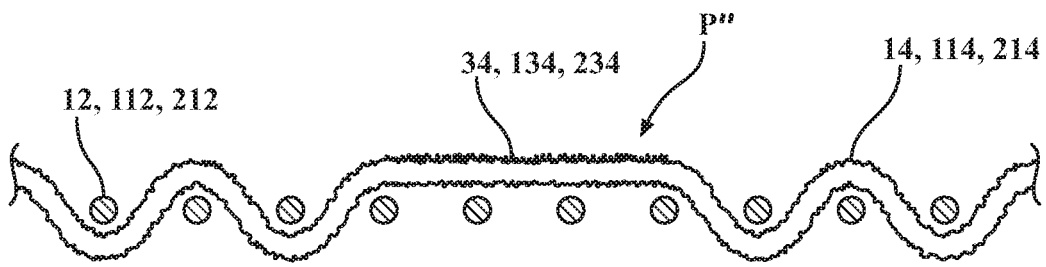
FIG. 8 is a fragmentary schematic end view of a wall of a wrappable protective textile sleeve constructed in accordance with yet a further aspect of the disclosure.

In accordance with another aspect of the disclosure, in each of the embodiments discussed above, rather than weaving the floats 34, 134, 234 forming the patches P, P', P''' with corresponding warp filaments 12, 112, 212, the floats 34, 134, 234 forming the patches P, P', P''' can be formed with corresponding weft filaments 14, 114, 214 (FIGS. 7 and 8), if desired, as will be understood by a person possessing ordinary skill in the art upon viewing the disclosure herein.

In accordance with a further aspect of the disclosure, at least some of the warp filaments 12, 112, 212 can be provided as monofilaments and/or less bulky multifilaments, as compared to the bulky, fluffy multifilaments 33 forming the loops 36, 136, 236. Accordingly, a vast majority of the sleeve wall 16, 116, 216 can be formed as desired for the intended application, with a relatively small portion of the wall 16, 116, 216 being formed having a patch P, P', P''' of loops 36, 136, 236, if desired.

Figure 9:
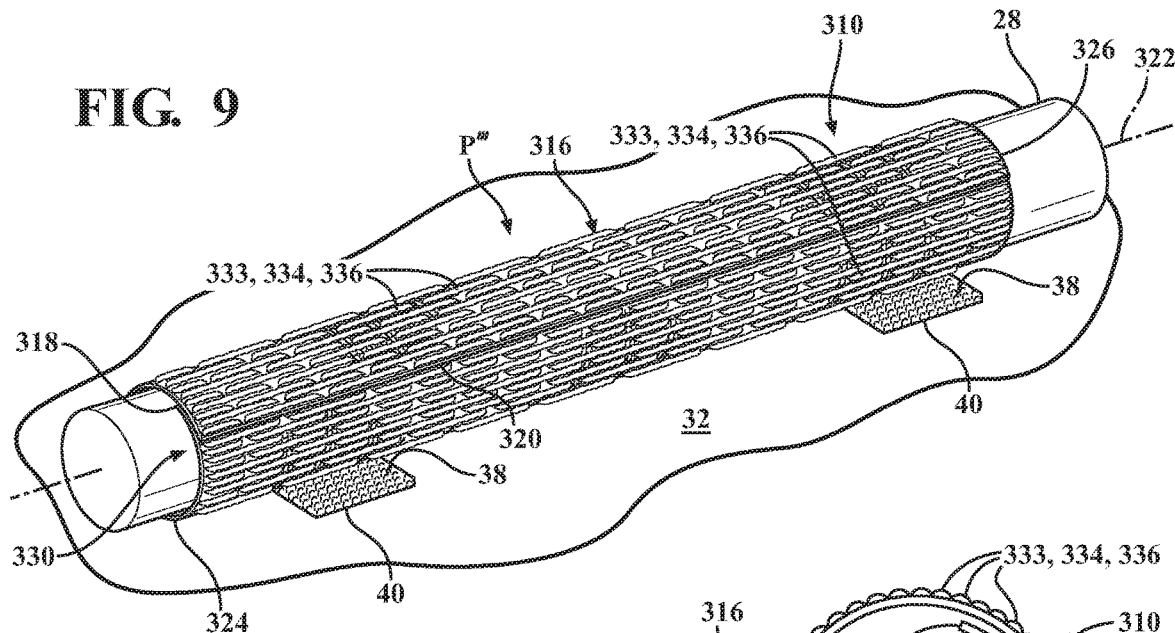
FIG. 9 is a schematic perspective view of a wrappable protective textile sleeve constructed in accordance with one aspect of the disclosure shown wrapped about an elongate member to be protected and attached to a support member.
Figure 11:
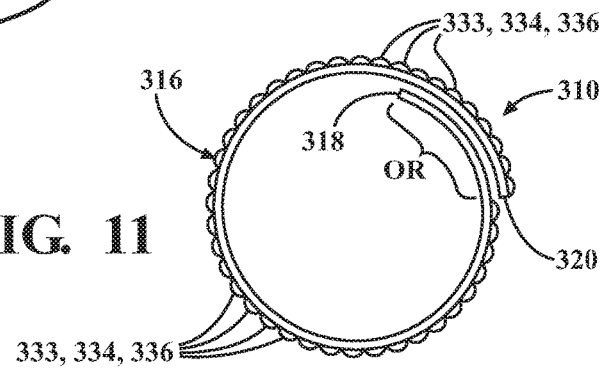
FIG. 11 is a schematic cross-sectional view of the wrappable protective textile sleeve of FIG. 9.
Figure 10:
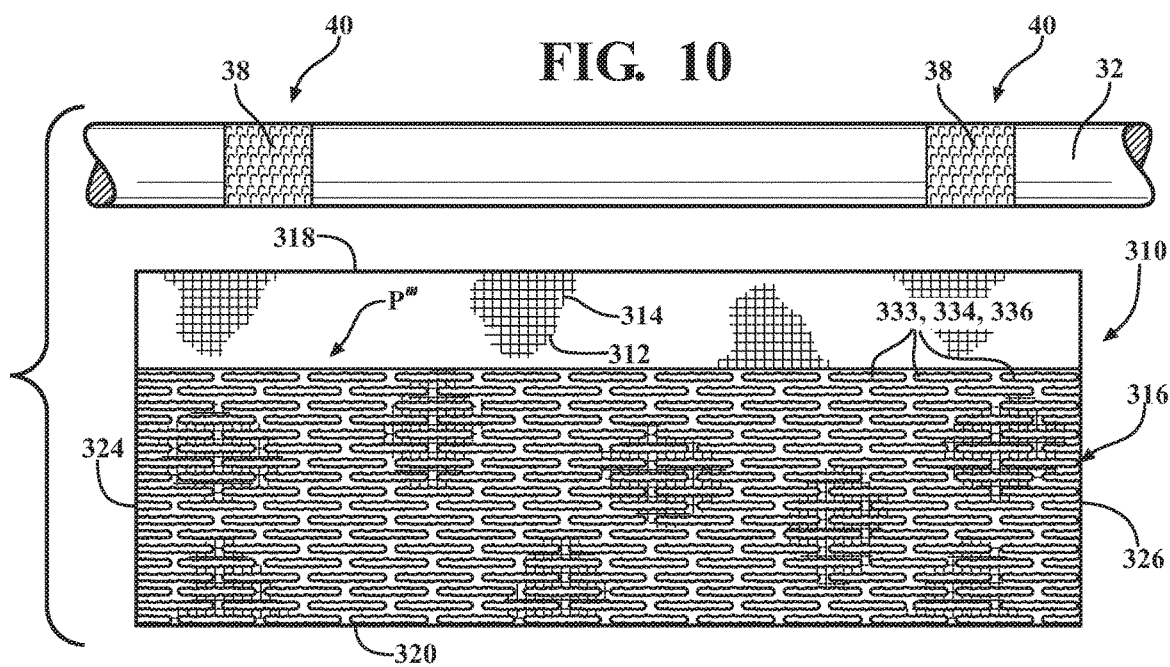
FIG. 10 is a schematic plan view of the wrappable protective textile sleeve of FIG. 9 shown in an unwrapped state.

In FIG. 9, a sleeve 310 is shown in accordance with another non-limiting embodiment of the disclosure, wherein the same reference numerals as used above, offset by a factor of 300, are used to identify like features. Unlike the sleeve 10 of FIGS. 1 and 1A, the floats 334, loops 336 and respective fastener patch P''' formed thereby is shown formed to extend about the entirety or substantially entirety (meaning it could be slightly less than the entirety) of the outwardly exposed surface of the sleeve 310 from one end 324 to an opposite end 326. With the sleeve 310 being wrappable about a central longitudinal axis 322, an overlapped region (OR) is formed by the regions of the wall 316 extending from the opposite sides 318, 320 being brought into overlapped relation with one another, wherein, as best shown in FIGS. 10 and 11, the overlapped region OR immediately adjacent and extending from the underlying side 318 does not include the bulky, fluffy yarn 333 forming the floats 334, thereby allowing for a tight overlap, and further providing a visual indicator for the desired amount of overlap of the opposite sides 318, 320. Further yet, by not having to include the bulky, fluffy yarn 333 in the overlapped region OR, the cost of the sleeve 310 is reduced by not having to include potentially more expensive bulky, fluffy yarns 333 over the entirety of the wall 316.

In FIG. 12, a weave diagram is illustrated in accordance with one aspect of the disclosure, wherein the weave diagram shows ends of warp filaments 312 along the horizontal axis numbered 1-10, with the warp filaments 312 extending along columns 1-10 in a vertical warp direction. In the diagram, the warp filaments 312 are identified by white spaces passing over corresponding weft filaments 314, while the weft filaments 314 are identified by black spaces passing over corresponding warp filaments 312. Accordingly, the vertically extending warp filaments 312 in columns 1-8 are woven with the corresponding horizontally extending weft filaments 314 in a plain weave pattern, by way of example and without limitation, while the vertically extending fluffy, bulky warp multifilaments 333 in columns 9-10 are woven with the corresponding horizontally extending weft filaments 314 in a pattern sufficient to form floats 334, shown, by way of example and without limitation, as a satin weave pattern. The weave pattern of FIG. 12, in accordance with one aspect of the disclosure, is followed using the warp filaments 312, 333 identified in the warp end diagram of FIG. 13. In FIG. 13, 38 dents are used to construct the non-limiting sleeve, such as the sleeve of FIG. 9, having a diameter of about 13 mm, by way of example and without limitation. Each of the 38 dents are woven with one or a plurality of warp end filaments, with the warp dents 1-11, corresponding to the overlap region (OR) extending from the underlying side 318, being woven solely with 2 warp end filaments 312 per dent, and in one embodiment, the 2 warp end filaments 312, identified by white circles (○), being provided in a non-limiting embodiment as standard multifilaments having a linear mass between about 133-147 tex. In contrast, each of the remaining warp dents 12-38, corresponding to the non-overlap region, extending from the overlap region (OR) to the overlying side 320, being woven with the same 2 warp end filaments 312 and in addition with a single bulky, fluffy multifilament 333, identified by black circles (●), being provided in a non-limiting embodiment as multifilaments having a linear mass of about 230 tex+/−20 tex. Accordingly, each of the dents 1-38 include a plurality of warp filaments 312, with some of the dents further including bulky, fluffy multifilaments 333. The bulky, fluffy multifilaments 333 are woven via the weave pattern shown in columns 9 and 10 of FIG. 12, and thus, the satin loops 336 of the bulky, fluffy multifilaments 333 in adjacent dents are formed in staggered relation relative to one another, thereby avoiding the formation of open spaces or gaps free of loops 336, thereby enhancing the coverage of the outer surface with loops 336, and thus, maximizing the ability of the entirety of the outer surface of the sleeve 310 to be fixed to corresponding hooks 38 of a hook portion 40 of a standard hook-and-loop type fastener. In the chart of FIG. 13, each filament within each dent 1-38 is identified as being woven in one of the patterns associated with columns 1-10 of FIG. 12 by a corresponding number 1-10 beneath the corresponding symbol (○), (●), as will be understood by one skilled in the art. As discussed above in the previous embodiments, with the bulky, fluffy multifilaments 333 being formed of very light and lofty multifilaments, such as can be purchased under specification polyethylene terephthalate (PET) 12×167 FR, by way of example and without limitation, numerous small, fluffy loops 336 are provided for fixation to hooks 38 of a hook portion 40 of a standard hook-and-loop type fastener, as discussed above. Accordingly, it is to be recognized that the aforementioned bulky, fluffy multifilament 333 can be used in any of the embodiments discussed above.

The weft filaments 314 can be provided of monofilaments and/or multifilaments, as discussed above, and in one presently preferred embodiment, at least in part or in entirety of heat-settable filaments, such as from heat-settable polyester monofilaments having a diameter between about 0.18-0.26 mm, and more preferably between about 0.20-0.24 mm, by way of example and without limitation. The heat-settable weft filaments 314 are able to be heat-set at a temperature that avoids flattening the fluffiness of the loops 336 of the bulky, fluffy multifilaments 333, and in accordance with one aspect, the wall 316 is able to be heat-set at about 205° C.+/−5° C. as a rate of about 3.75 m/min, whereupon the wall 316 retains the tubular heat-set configuration as shown in FIGS. 9 and 11.

Each of the warp and weft filaments 312, 314, 333 can be provided having fire retardant properties, with a limit oxygen index (LOI, wherein LOI is the minimum concentration of oxygen, expressed as a percentage, that will support combustion of a polymer) greater than 25%, thereby rendering the sleeve 310 suitable for use in elevated temperature environments. It is to be recognized that the warp and weft filaments discussed above for each of the aforementioned embodiments may also be provided having fire retardant properties. It is further contemplate herein that the filaments used to construct the aforementioned sleeves can be provided as halogen-free filaments.

It is contemplated herein that a sleeve having a larger or smaller diameter than the 13 mm diameter sleeve discussed above can be made using similar patterns discussed above, with more or fewer warp filaments. For example, a sleeve having a diameter of about 5 mm is contemplated herein, wherein the sleeve can be made having about 19 warp dents, wherein 15 of the warp dents are each formed including 3 warp ends, including 2 warp filaments 312 and 1 fluffy, bulky warp multifilament 333, with the 2 warp filaments 312 being woven in a plain weave with corresponding weft filaments 314, and the bulky warp multifilament 333 being woven to form outwardly facing floats, such as in a satin pattern. Meanwhile, the remaining 4 dents can each be formed including 2 warp filaments 312, with 2 of the 4 dents extending immediately adjacent opposite lengthwise extending sides configured for overlapping relation with one another. Such an example is shown in FIG. 14. It is to be recognized that the associated weft yarns can be provided as discussed above, such as from heat-settable filaments.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A wrappable textile sleeve for protecting elongate members, comprising:
   a wall including a plurality of warp filaments and at least one weft filament woven with one another, said wall having opposite sides extending lengthwise in generally parallel relation with a central longitudinal axis between opposite ends, said opposite sides being wrappable about said central longitudinal axis into overlapping relation with one another to bound the elongate member within a cavity bounded by an inner surface of the sleeve; and
   at least one of said warp and/or weft filament being provided as a bulky, fluffy multifilament woven to form a plurality of floats, each of said plurality of floats extending over 2 or more weft and/or warp yarns, wherein each of said plurality of floats provide loops along an outer surface of the sleeve suited for attachment to hooks of a standard hook and loop fastener, wherein a plurality of said plurality of floats are immediately adjacent one another to form at least one fastener patch.

2. The wrappable textile sleeve of claim 1, further including a plurality of said warp filaments being provided as said bulky, fluffy multifilaments adjacent one another, with said adjacent bulky, fluffy multifilaments having floats adjacent one another to form said at least one fastener patch.

3. The wrappable textile sleeve of claim 1, further including a plurality of said weft filaments being provided as said bulky, fluffy multifilaments adjacent one another, with said adjacent bulky, fluffy multifilaments forming floats adjacent one another to form said at least one fastener patch.

4. The wrappable textile sleeve of claim 1, wherein said plurality of floats is formed having a twill pattern.

5. The wrappable textile sleeve of claim 1, wherein at least some of said plurality of floats are formed having a satin pattern.

6. The wrappable textile sleeve of claim 1, wherein said plurality of floats are formed to extend over only a portion of the length of the wall.

7. The wrappable textile sleeve of claim 1, wherein a plurality of said plurality of floats extend in succession along a full length of the wall.

8. The wrappable textile sleeve of claim 2, wherein said plurality of floats can be formed to extend over only a portion of the circumference of said wall.

9. The wrappable textile sleeve of claim 2, wherein said plurality of floats can be formed to extend about the full circumference of said wall.

10. The wrappable textile sleeve of claim 2, wherein at least some of said warp filaments are provided as monofilaments.

11. The wrappable textile sleeve of claim 1, wherein at least some of said weft filaments are provided as heat-settable monofilaments to be heat-set and bias said opposite sides into overlapping relation with one another.

12. The wrappable textile sleeve of claim 11, wherein each of said weft filaments are provided as heat-settable monofilaments to be heat-set and bias said opposite sides into overlapping relation with one another.

13. The wrappable textile sleeve of claim 1, wherein said warp filaments are woven over a plurality of dents, wherein a plurality of said dents each include a plurality of filaments, with at least one of said plurality of filaments including said bulky, fluffy multifilament.

14. The wrappable textile sleeve of claim 13, wherein at least one of said plurality of filaments is a standard multifilament having a denier less than the denier of said bulky, fluffy multifilament.

15. The wrappable textile sleeve of claim 14, wherein said bulky, fluffy multifilament is woven in a satin weave pattern and said standard multifilament is woven in a plain weave pattern.

16. The wrappable textile sleeve of claim 14, wherein the linear mass of said bulky, fluffy multifilament is between about 210-250 tex.

17. The wrappable textile sleeve of claim 16, wherein the linear mass of said standard multifilament is between about 133-147 tex.

18. A method of constructing the wrappable textile sleeve of claim 1, comprising: weaving a plurality of warp filaments and at least one weft filament with one another to form a woven wall; weaving the wall having opposite sides extending lengthwise between opposite ends, with the opposite sides being wrappable about a central longitudinal axis into overlapping relation with one another; and weaving at least one warp and/or weft filament as a bulky, fluffy multifilament and forming a plurality of floats extending over 2 or more weft and/or warp yarns with the fluffy multifilament, with the plurality of floats forming a plurality of loops configured for fixation to hooks of a standard hook and loop fastener.

19. The method of claim 18, further including weaving a plurality of the warp filaments as the bulky, fluffy multifilaments adjacent one another so that adjacent bulky, fluffy multifilaments form floats adjacent one another to form at least one discrete fastener patch of the loops.

20. The method of claim 19, further including forming the at least one discrete patch to extend over only a portion of the length of the wall.

21. The method of claim 20, further including forming a plurality of the discrete patches along the length of the wall, with the plurality of patches being axially aligned with one another and axially spaced from one another by portions of the wall being free of patches.

22. The method of claim 21, further including forming the patches to extend over only a portion of a circumference of the wall.

23. The method of claim 21, further including forming the patches to extend about an entirety of a circumference of the wall.

24. The method of claim 19, further including forming a plurality of the discrete patches immediately adjacent one another and axially aligned with one another along the entire length of the wall.

25. The method of claim 18, further including weaving a plurality of the weft filaments as the bulky, fluffy multifilaments adjacent one another so that adjacent bulky, fluffy multifilaments form floats adjacent one another to form at least one discrete fastener patch of the loops.

26. The method of claim 25, further including forming the at least one discrete patch to extend over only a portion of the length of the wall.

27. The method of claim 26, further including forming a plurality of the discrete patches along the length of the wall, with the plurality of patches being axially aligned with one another and axially spaced from one another by portions of the wall being free of patches.

28. The method of claim 27, further including forming the patches to extend over only a portion of a circumference of the wall.

29. The method of claim 27, further including forming the patches to extend about an entirety of a circumference of the wall.

30. The method of claim 25, further including forming a plurality of the discrete patches immediately adjacent one another and circumferentially aligned with one another to extend about an entirety of a circumference of the wall.

31. The method of claim 25, further including weaving at least some of the warp filaments as monofilaments.

32. The method of claim 25, further including weaving at least some of the weft filaments as heat-settable monofilaments to be heat-set and bias the opposite sides into overlapping relation with one.

33. The method of claim 18, further including weaving the warp filaments over a plurality of dents and providing a plurality of the dents each including a plurality of filaments, with at least one of the plurality of filaments including the bulky, fluffy multifilament.

34. The method of claim 33, further providing at least one of the plurality of filaments as a standard multifilament having a denier greater than the denier of the bulky, fluffy multifilament.

35. The method of claim 34, further including weaving the bulky, fluffy multifilament in a satin weave pattern and weaving the standard multifilament in a plain weave pattern.

36. The method of claim 34, further including providing the linear mass of the bulky, fluffy multifilament being between about 210-250 tex.

37. The method of claim 36, further including providing the linear mass of the standard multifilament being about 133-147 tex.

38. The method of claim 18, further including providing the linear mass of the bulky, fluffy multifilament being between about 210-250 tex.

\* \* \* \* \*